Patented May 8, 1951

2,551,647

UNITED STATES PATENT OFFICE 2,551,647

3 - HYDROXY-4-OXO-NAPHTHYLIDENEAMI-NO-BENZAMIDES AND METHOD FOR PREPARING SAME

Norbert Steiger, Nutley, N. J., assignor to Hoffmann-La Roche Inc., Nutley, N. J., a corporation of New Jersey No Drawing. Application February 8, 1950, Serial No. 143,150

13 Claims. (Cl. 260—396)

The present invention relates to compounds which, in one of their tautomeric forms, can be represented by the following formula:

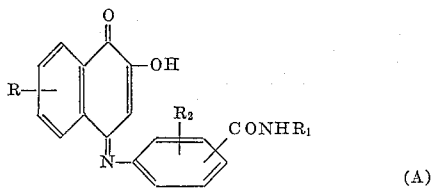

(A)

and in another tautomeric form by the following formula:

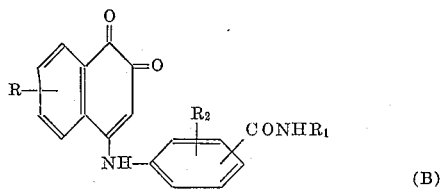

(B)

wherein R stands for hydrogen or a sulfo group, R being in one of the positions 6 and 7; $R_1$ stands for a lower hydroxyalkyl or lower hydroxyalkylaminoalkyl radical in which the alkyl contains at least two carbon atoms; and $R_2$ stands for hydrogen or a hydroxyl group, $CONHR_1$ being in one of the positions meta and para to =N— or —NH—, and $R_2$ being ortho to $CONHR_1$. The invention also embraces the salts of the compounds where R stands for sulfo. The compounds of Formula A can be designated as (1,4 - dihydro - 3 - hydroxy - 4 - oxo - 1 - naphthylideneamino) - N - (lower hydroxyalkyl and lower hydroxyalkylaminoalkyl) benzamides, while the tautomers thereof represented by Formula B can be designated as (3,4-dihydro-3,4 - dioxo - 1 - naphthylamino) - N - (lower hydroxyalkyl and lower hydroxyalkylaminoalkyl) benzamides.

The new compounds can be prepared by condensing a 1,2-naphthoquinone-sulfonic acid having a sulfo group in the 4-position or the salts thereof, i. e., the sodium or potassium salts, with an amino-N-(lower hydroxyalkyl or lower hydroxyalkylaminoalkyl) benzamide which can be represented by the following formula:

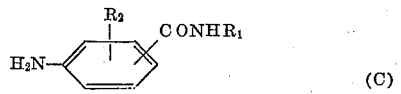

(C)

wherein $R_1$ and $R_2$ have the same significance already assigned thereto, $CONHR_1$ being in one of the positions meta and para to —$NH_2$ and $R_2$ being ortho to $CONHR_1$. When the condensation is carried out at a pH below 3, as when the reaction medium is blue to Congo indicator, the (1,4 - dihydro - 3 - hydroxy - 4 - oxo - 1 - naphthylideneamino - N - (lower hydroxyalkyl and lower hydroxyalkylaminoalkyl) benzamides are obtained. When the pH of the reaction medium is 5 and higher, as when the reaction medium is neutral to Congo, that is red to Congo, the tautomeric form B of the compounds are obtained.

In general, the condensation reaction is carried out in an aqueous medium, the aminobenzamides being dissolved in water or a dilute inorganic acid, as for example, hydrochloric acid, and the resulting solution being added to an aqueous suspension or sludge of the 1,2-naphthoquinone-sulfonic acid or a salt thereof, while stirring or agitating. The temperature may vary over a wide range, for example, from about 15–60° C. The reaction is usually complete in about 2 to 3 hours. When a 1,2-naphthoquinonedisulfonic acid which contains one of its sulfo groups in the 4-position, or salt thereof is employed, the condensation product contains a sulfo group. The products which contain a sulfo group are generally soluble in water, especially in the form of their alkali salts, while those which do not contain a sulfo group are insoluble in water. The new compounds are of interest in combatting virus infections.

The amino-N-(lower hydroxyalkyl and lower hydroxyalkylaminoalkyl) benzamides employed in the synthesis can be prepared by reacting a nitrobenzoyl chloride with a lower hydroxyalkylamine or a lower hydroxyalkylaminoalkylamine in which the alkyl group contains at least two carbon atoms to form the corresponding nitro-N-(lower hydroxyalkyl and lower hydroxyalkylaminoalkyl) benzamides, and reducing the latter to form the corresponding amino-N-(lower hydroxyalkyl and lower hydroxyalkylaminoalkyl) benzamides. According to another procedure, an aminobenzoic acid alkyl ester can be reacted with one of the aforesaid hydroxy alkyl amines, to form the desired amino benzamide. The preparation of these intermediates is illustrated by the following examples.

EXAMPLE A p-Amino-N-[β-(β-hydroxyethylamino)-ethyl]benzamide

To 400 cc. of water, 125 grams of β-(β-aminoethylamino)ethanol and 60 grams of sodium carbonate there was added 136 grams of p-nitrobenzoylchloride while stirring at 75–90° C. The stirring was continued for 4 hours at 90° C. after which the reaction mixture was diluted with 1000 cc. of water. Upon standing for 16 hours, crystals of p - nitro - N - [β - (β - hydroxyethyl-amino)ethyl]benzamide were formed. The crystals were filtered off and washed with three 100 cc. portions of ice water.

240 grams of iron filings, 700 cc. of water and 10 cc. of acetic acid were refluxed for 30 minutes and the prepared p-nitro-N-[β-(β-hydroxyethyl-amino)ethyl]benzamide was added thereto at 90-100° C. together with 150 cc. of water. The mixture was refluxed for 4 hours and 55 cc. of 20% solution of sodium carbonate and 300 cc. of water added thereto at 90° C. 10 grams of a filter aid were added, the mixture was refluxed and then filtered at 95-100° C. The filter cake was washed with 500 cc. of boiling water, and the filtrate treated with 350 grams of sodium chloride and stirred. The p-amino-N-[β-(β-hydroxy-ethylamino)ethyl]benzamide crystallized, M. P. 167-169° C.

EXAMPLE B

*m-Amino-N-[β-(β-hydroxyethylamino)-ethyl]benzamide*

To 400 cc. of water, 125 grams of β-(β-amino-ethylamino)ethanol, and 60 grams of sodium carbonate there were added 186 grams of m-nitro-benzoylchloride with stirring at 75-90° C. The stirring was continued for 4 hours at 90° C. after which 1000 cc. of water were added to the reaction mixture. Upon standing for 16 hours, crystals of m-nitro-N-[β-(hydroxyethylamino)-ethyl]benzamide were formed. They were filtered and washed with three 100 cc. portions of ice water. 230 grams of iron filings, 10 cc. of acetic acid and 500 cc. of water were refluxed for 30 minutes and then there was added thereto the above prepared m-nitro-N-[β-(hydroxyethyl-amino)ethyl]benzamide and 150 cc. of water. The mixture was refluxed for 4 hours, and 55 cc. of 20% sodium carbonate and 300 cc. of water added thereto at 95-97° C. 10 grams of filter aid were added, the mixture was refluxed, and then filtered at 95-100° C. The filter cake was washed with 500 cc. of boiling water and to the filtrate were added 350 grams of sodium chloride. The m-amino - N - [β-(β-hydroxyethylamino)ethyl]-benzamide was obtained as a viscous oil.

EXAMPLE C

*4-amino-N-(2-hydroxypropyl)benzamide*

To 400 cc. of water, 85 grams of isopropanol-amine and 60 grams of sodium carbonate there were added 186 grams of p-nitrobenzoylchloride at 75-90° C. The mixture was stirred for 3 hours at 90° C., then filtered at room temperature to obtain the 4-nitro-N-(2-hydroxypropyl)benz-amide which had formed. The nitro compound was reduced by refluxing for 5 hours with 220 grams of iron filings, 5 cc. of acetic acid, and 900 cc. of water. 20 grams of sodium carbonate were added followed by filtration to remove the iron and salting the filtrate with 200 grams of sodium chloride. There were obtained white crystals of 4-amino-N-(2-hydroxypropyl)benzamide, M. P. 121-123° C.

EXAMPLE D

*4-amino-N-(3-hydroxypropyl)benzamide*

To 400 cc. of water, 67 grams of 3-amino-pro-panol and 70 grams of sodium carbonate there were added 170 grams of p-nitrobenzoylchloride. The mixture was stirred for 2 hours at 90° C., then 400 cc. of a 30% solution of sodium chloride were added and the medium cooled to 15° C. The mixture was then filtered to recover the 4-nitro-N-(3-hydroxypropyl)benzamide which had formed. The compound was washed with three 150 cc. portions of 30% sodium chloride solution. 250 grams of iron filings, 10 cc. of acetic acid and 2 cc. of concentrated (36.5%) hydrochloric acid were refluxed for one hour and then there was added thereto the above prepared 4-nitro-N-(3-hydroxypropyl)benzamide and 150 cc. of water at 95-100° C. The mixture was refluxed for 4 hours, made alkaline with 16 grams of sodium carbonate and filtered hot. The filtrate was concentrated in vacuo and treated with 300 cc. of 30% sodium chloride solution, whereupon 4-amino-N-(3-hydroxypropyl)benzamide separated out as a viscous oil.

EXAMPLE E

*4-amino-2-hydroxy-N-(2-hydroxyethyl)-benzamide*

30 grams of 4-aminosalicyclic acid methyl ester and 30 grams of monoethanolamine were mixed together and the mixture heated to 130° C. At this temperature a spontaneous reaction took place with liberation of heat. The temperature rose gradually to 155° C. without any further application of heat. This temperature was maintained for 15 minutes and the mixture was then allowed to cool. 50 cc. of water were added and hydrochloric acid was then added drop-wise to a pH of 6-7. On cooling 4-amino-2-hydroxy-N-(2-hydroxyethyl)benzamide crystallized. The crystals were sucked off and washed with a small amount of water. A sample of the compound recrystallized from water melted at 165-166° C.

The following examples will serve to illustrate the preparation of the (1,4-dihydro-3-hydroxy-4-oxo-1-naphthylideneamino) - N - lower hydroxy-alkyl and lower hydroxyalkylaminoalkyl)benz-amides, and the tautomers thereof.

EXAMPLE 1

*4 - (1,4 - dihydro-3-hydroxy-4-oxo-1-naphthyli-deneamino) - N - [β - (β - hydroxyethylamino) ethyl]benzamide*

12 grams of p-amino-N-[β-(β-hydroxyethyl-amino)ethyl]benzamide were dissolved in 200 cc. of dilute hydrochloric acid (prepared from 20 cc. of hydrochloric acid, specific gravity 1.19, diluted with 180 cc. of water) at 40-50° C. and the clear solution was dropped into a sludge of 22 grams of 1,2-naphthoquinone-4-potassium sulfonate in 300 cc. of water with agitation. The reaction medium was blue to Congo. 6 cc. of hydrogen peroxide (30% by weight) were added to convert any potassium bisulfite formed to potassium sulfate. The condensation reaction was complete after 3 hours. A red precipitate was obtained which was isolated by filtration, the filter cake washed with water and dried. 4-(1,4-di-hydro-3-hydroxy-4-oxo-1-naphthylideneamino)-N - [β - (β-hydroxyethylamino)ethyl]benzamide was obtained as a dark red powder.

EXAMPLE 2

*4 - (1,4 - dihydro - 3 - hydroxy-4-oxo-7-sulfo-1-naphthylideneamino)-N-[β-(β - hydroxyethyl-amino)ethyl]benzamide potassium salt*

9 grams of p-amino-N-[β-(β-hydroxyethyl-amino)ethyl]benzamide were dissolved in 5 cc. of concentrated (36.5%) hydrochloric acid and 60 cc. of water at 60° C. and the solution dropped into a sludge of 20 grams of 1,2-naphthoquinone-4,6-dipotassium disulfonate in 100 cc. of water. The reaction medium was blue to Congo. The 4 - (1,4 - dihydro - 3 - hydroxy-4-oxo-7-sulfo - 1 - naphthylideneamino) - N - [β-(β-hydroxyethyl-amino)ethyl]benzamide potassium salt precipitated as a red colored product after short stirring which is continued for 3 hours. The compound was filtered and washed with ice water and dried. When dried a red powder soluble in water was obtained.

A 3% solution of the compound can be prepared by dissolving 3 grams of the compound together with 5 cc. of sodium acetate solution (20%) and 3 cc. of sodium carbonate (20%), and 75 cc. of water at the boil. The solution is filtered and the filtrate diluted with water to 100 cc. The solution is stable.

EXAMPLE 3

*Potassium salt of 4-(1,4-dihydro-3-hydroxy-4-oxo - 7 - sulfo - 1 - naphthylideneamino) -N-2-hydroxyethyl) benzamide*

9 grams of 4-amino-N-(2-hydroxyethyl)benzamide were dissolved in 5 cc. of concentrated (36.5%) hydrochloric acid and 100 cc. of water. The solution was dropped into a sludge of 25 grams of 1,2 - naphthoquinone - 4,6 - dipotassium sulfonate, 100 cc. water and 3 cc. of concentrated hydrochloric acid while cooling to 20–25° C. The reaction medium was blue to Congo. The potassium salt of 4-(1,4-dihydro-3-hydroxy-4-oxo-7-sulfo-1-naphthylideneamino) - N - (2 - hydroxyethyl)benzamide precipitated and there were added 6 cc. of hydrogen peroxide (30%) and stirring was continued for 3 hours. After filtration and drying, the compound was obtained as a red powder soluble in water.

EXAMPLE 4

*3-(1,4 - dihydro-3-hydroxy - 4 - oxo-1-naphthylideneamino) - N - [β-(β-hydroxyethylamino)-ethyl]benzamide*

11 grams of m-amino-N-[β-(β-hydroxyethylamino)ethyl]benzamide were dissolved in 5 cc. of concentrated (36.5%) hydrochloric acid and 100 cc. of water at 60° C. The solution was added to a sludge of 25 grams of 1,2-naphthoquinone-4-sodium sulfonate in 300 cc. of water. The 3-(1,4-dihydro - 3 - hydroxy - 4 - oxo - 1 - napthylideneamino) - N - [β - (β - hydroxyethylamino)ethyl]-benzamide precipitated, 6 cc. of hydrogen peroxide (30%) were added and the mixture stirred for 3 hours. After filtration and drying the compound was obtained as a red powder which is insoluble in water but soluble in 85% alcohol–15% water solution.

EXAMPLE 5

*4 - (1,4-dihydro - 3 - hydroxy-4-oxo-1-naphthylideneamino) -N-(2-hydroxypropyl) benzamide*

10 grams 4-amino-N-(2-hydroxypropyl)benzamide were dissolved in 150 cc. of water at 70° C. and the resulting solution was dropped into a sludge of 22 grams of 1,2-naphthoquinone-4-sulfonic acid in 300 cc. of water and the mixture stirred for 3 hours. The reaction medium was blue to Congo. The condensation product which formed was filtered and dried, the 4-(1,4-dihydro - 3 - hydroxy - 4 - oxo - 1 - naphthylideneamino) - N - (2-hydroxypropyl)benzamide being obtained as a red powder which was crystallized from acetic acid-ether, M. P. 214° C.

EXAMPLE 6

*4 - (1,4-dihydro - 3 - hydroxy-4-oxo-1-naphthylideneamino) -N-(3-hydroxypropyl) benzamide*

10 grams of 4 - amino - N - (3-hydroxypropyl)-benzamide were dissolved in 100 cc. of water and 5 cc. of 36.5% hydrochloric acid. The resulting solution was added to a sludge of 20 grams of 1,2-naphthoquinone-4-potassium sulfonate in 500 cc. of water, and the mixture stirred for 4 hours. The dark red condensation product which formed was filtered, washed with water and dried. The 4 - (1,4-dihydro-3-hydroxy - 4 - oxo-1-naphthylideneamino) - N - (3-hydroxypropyl)benzamide was obtained as a dark red powder. It was soluble in 85% ethanol–15% water solution.

EXAMPLE 7

*4-(1,4-dihydro-3-hydroxy-4-oxo-6-sulfo-1-naphthylideneamino) - N - [β - (β - hydroxyethylamino)ethyl]benzamide sodium salt*

10 grams of p-amino-N-[β-(β-hydroxyethylamino)ethyl]benzamide were dissolved in 5 cc. of 36.5% hydrochloric acid and 100 cc. of water at 50–60° C. The resulting solution was dropped into a sludge of 20 grams of 1,2-naphthoquinone-4,7-disodium sulfonate in 120 cc. of water and the mixture stirred for 4 hours. It was then filtered, washed with ice water and dried. The 4-(1,4-dihydro-3-hydroxy-4-oxo-6-sulfo-1-naphthylideneamino) - N-[β-(β-hydroxyethylamino)-ethyl]benzamide sodium salt was obtained as a red powder, and was soluble in water.

EXAMPLE 8

*4-(3,4-dihydro-3,4-dioxo-1-naphthylamino) - N - (β-hydroxyethyl) benzamide*

5 grams of N-(2-hydroxyethyl)-4-aminobenzamide were dissolved in 10 cc. of 36.5% hydrochloric acid and 150 cc. of water at 60° C. The resulting solution was added to a sludge of 10 grams of 1,2-naphthoquinone-4-potassium sulfonate and 25 grams of sodium acetate in 400 cc. of water. The reaction medium was neutral to Congo. A bright red colored precipitate was formed. After 30 minutes of stirring, 4 cc. of 30% hydrogen peroxide were added and stirring was continued for 2 hours. After filtration, the product was obtained as a red powder insoluble in water. The thus obtained 4-(3,4-dihydro-3,4-dioxo-1-naphthylamino) - N - (β-hydroxyethyl)-benzamide was crystallized from 80% ethanol–20% water solution, and then melted at 245–247° C.

EXAMPLE 9

*4-(3,4-dihydro-3,4-dioxo-1-naphthylamino) - N - [β-(β-hydroxyethylamino)ethyl]-benzamide*

5 grams of p-amino-N-[β-(β-hydroxyethylamino)ethyl]benzamide, 5 cc. of 36.5% hydrochloric acid and 100 cc. of water were heated to solution, and the resulting solution was added to a sludge of 10 grams of 1,2-naphthoquinone-4-sodium sulfonate, 300 cc. of water and 50 grams of sodium acetate. The reaction medium was neutral to Congo. A scarlet red colored product precipitated. After stirring the reaction medium for 15 minutes there were added 3 cc. of 30% hydrogen peroxide and stirring was continued for 4 hours. After filtration and drying the 4-(3,4-dihydro-3,4-dioxo-1-naphthylamino) - N - [β-(β-hydroxyethylamino)ethyl]benzamide was obtained as a bright red powder. It is insoluble in water but soluble in ethanol and methanol. The

EXAMPLE 10

*4-(3,4-dihydro-3,4-dioxo-1-naphthylamino) - N - (3-hydroxypropyl) benzamide*

A solution made up of 10 grams of 4-amino-N-(3-hydroxypropyl) benzamide and 200 cc. of water was dropped into a sludge of 20 grams of 1,2-naphthoquinone-4-sodium sulfonate, 600 cc. of water, 5 cc. of acetic acid, and 10 grams of sodium acetate. The reaction medium was neutral to Congo. A bright red precipitate formed and the reaction mixture was stirred for 5 hours. The precipitate was filtered off, washed with water and dried to recover 4-(3,4-dihydro-3,4-dioxo-1-naphthylamino) - N - (3-hydroxypropyl) benzamide. The compound is a tautomer of the compound obtained in Example 6.

EXAMPLE 11

*4-(1,4-dihydro-3-hydroxy-4 - oxo - 1 - naphthylideneamino)-2-hydroxy - N - (2-hydroxyethyl) - benzamide*

10 grams of 4-amino-2-hydroxy-N-(2-hydroxyethyl) benzamide were dissolved at 30–40° C. in a solution made up of 5 cc. of 36.5% hydrochloric acid and 150 cc. of water. The resulting solution was dropped into a slurry of 25 grams of 1,2-naphthoquinone-4-potassium sulfonate in 400 cc. of water with stirring. The reaction medium was blue to Congo. A dark red brown colored precipitate formed. 6 cc. of hydrogen peroxide (30%) were added and the stirring was continued for 4 hours. The precipitate was filtered and washed with water and dried. 4-(1,4-dihydro-3-hydroxy-4-oxo-naphthylideneamino)-2-hydroxy - N - (2-hydroxyethyl) benzamide was obtained as a dark red brown powder, insoluble in water.

EXAMPLE 12

*4-(3,4-dihydro-3,4-dioxo - 1 - naphthylamino)-2-hydroxyethyl-benzamide*

10 grams of 4-amino-2-hydroxy-N-(2-hydroxyethyl) benzamide were dissolved in a solution made up of 5 cc. 36.5% hydrochloric acid and 150 cc. of water. The resulting solution was dropped into a slurry of 25 grams of 1,2-naphthoquinone-4-potassium sulfonate and 20 grams of sodium acetate in 400 cc. of water. The reaction medium was neutral to Congo. A red colored precipitate formed. 6 cc. of hydrogen peroxide (30%) were added and the reaction mixture was stirred for 4 hours. The precipitate was filtered, washed with water and dried. 4-(3,4-dihydro-3,4-dioxo-1-naphthylamino)-2-hydroxy - N - (2-hydroxyethyl) benzamide was obtained as a red powder, insoluble in water. The compound is a tautomer of the compound of Example 11.

I claim:

1. A compound which, in one of its tautomeric forms, can be represented by the following formula:

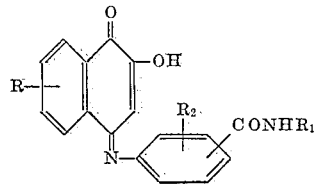

where R is a member of the group consisting of hydrogen and a sulfo radical, R being in one of the positions 6 and 7; $R_1$ is a member of the group consisting of a lower hydroxyalkyl and a lower hydroxyalkylaminoalkyl radical, in which the alkyl contains at least two carbon atoms; and $R_2$ is a member of the group consisting of hydrogen and a hydroxyl radical, $CONHR_1$ being in one of the positions meta and para to =N—, and $R_2$ being ortho to $CONHR_1$, and the salts thereof.

2. The compound 4-(1,4-dihydro-3-hydroxy-4 - oxo - 1 - naphthylideneamino)-N-[β-(β - hydroxyethylamino) ethyl] benzamide.

3. The potassium salt of 4-(1,4-dihydro-3-hydroxy-4-oxo - 7-sulfo - 1 - naphthylideneamino)-N-[β-(β-hydroxyethylamino) ethyl] benzamide.

4. The compound 4-(1,4-dihydro-3-hydroxy-4-oxo - 1 - naphthylideneamino)-2-hydroxy-N-(2-hydroxyethyl) benzamide.

5. The potassium salt of 4-(1,4-dihydro-3-hydroxy-4-oxo-7-sulfo - 1 - naphthylideneamino)-N-(2-hydroxyethyl) benzamide.

6. The compound 3-(1,4-dihydro-3-hydroxy-4-oxo-1-naphthylideneamino) - N-[β-(β-hydroxyethylamino) ethyl] benzamide.

7. The process which comprises condensing a compound of the group consisting of a 1,2-naphthoquinone-4-sulfonic acid and the salts thereof with a compound of the group consisting of an amino - N - (lower hydroxyalkyl) benzamide and an amino - N - (lower hydroxyalkylaminoalkyl) - benzamide in which the alkyl groups contain at least two carbon atoms.

8. The process of claim 7, wherein the reaction medium is blue to Congo.

9. The process of claim 7, wherein the reaction medium is neutral to Congo.

10. The process which comprises condensing p-amino - N - [β-(β-hydroxyethylamino) ethyl]-benzamide with 1,2-naphthoquinone - 4 - potassium sulfonate in an aqueous medium which is blue to Congo.

11. The process which comprises condensing p-amino-N-[β - (β - hydroxyethylamino) ethyl]-benzamide with 1,2-naphthoquinone-4,6-dipotassium sulfonate in an aqueous medium which is blue to Congo.

12. The process which comprises condensing 4-amino-N-(2-hydroxyethyl) benzamide with 1,2-naphthoquinone-4,6-dipotassium sulfonate in an aqueous medium which is blue to Congo.

13. The process which comprises condensing 4-amino - 2-hydroxy-N-(2 - hydroxyethyl) benzamide with 1,2-naphthoquinone-4-potassium sulfonate in an aqueous medium which is blue to Congo.

NORBERT STEIGER.

No references cited.